ENGEBRET JENSEN, EDWARD JENSEN & FRANK W. AUSTIN.
FERTILIZER DISTRIBUTER ATTACHMENT FOR CULTIVATORS.
APPLICATION FILED MAY 28, 1908.
950,230.
Patented Feb. 22, 1910.
2 SHEETS—SHEET 1.
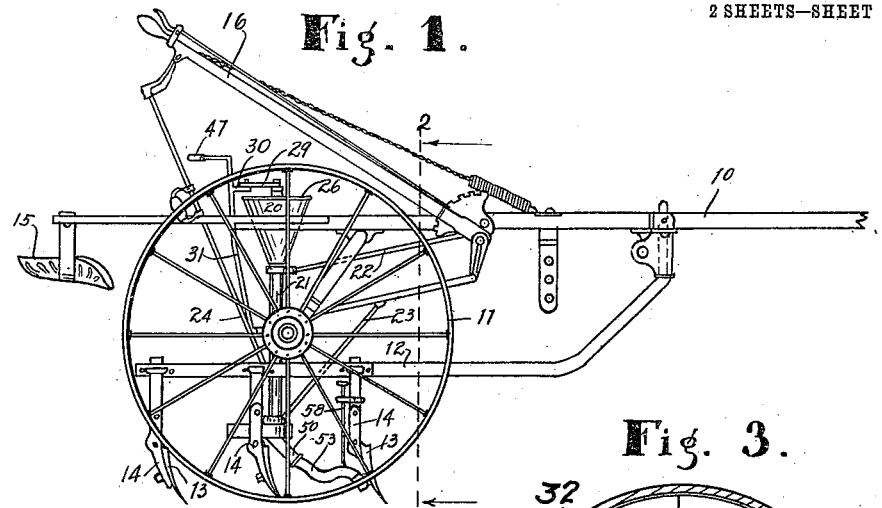
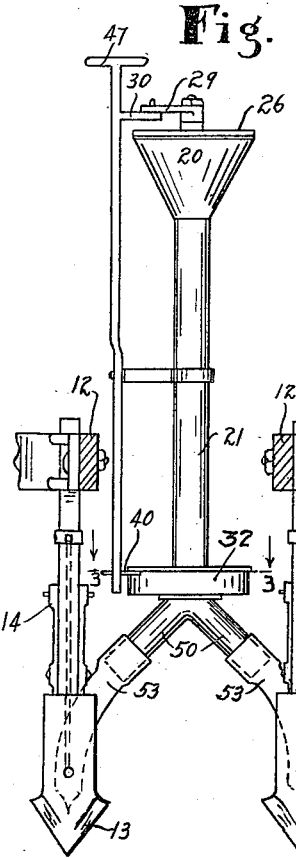
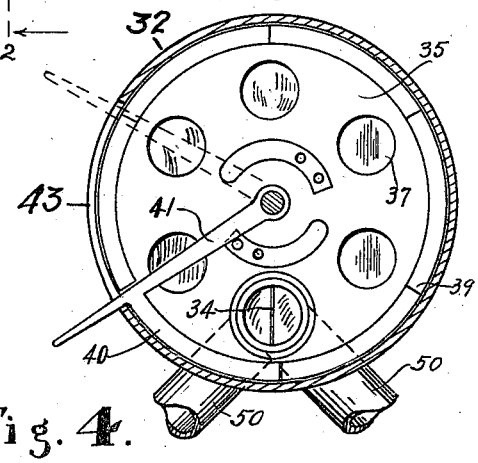
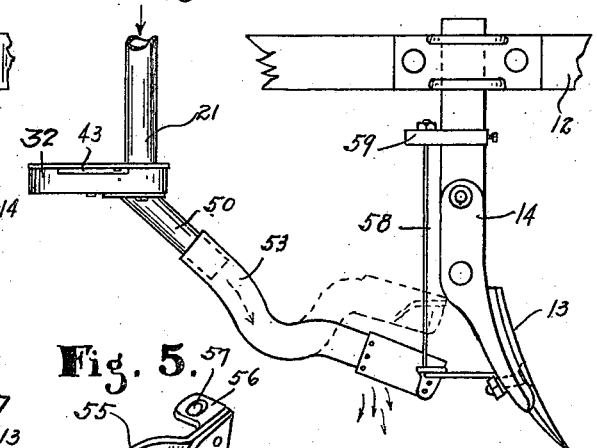
WITNESSES:
J. H. Swan.
R. J. Lockwood.
INVENTORS.
Engebret Jensen.
Edward Jensen.
BY Frank W. Austin.
V. H. Lockwood
ATTORNEY.

ENGEBRET JENSEN, EDWARD JENSEN & FRANK W. AUSTIN.
FERTILIZER DISTRIBUTER ATTACHMENT FOR CULTIVATORS.
APPLICATION FILED MAY 28, 1908.

950,230.

Patented Feb. 22, 1910.

2 SHEETS—SHEET 2.

WITNESSES:
J. H. Swan
R. G. Lockwood

INVENTORS
Engebret Jensen
Edward Jensen
Frank W. Austin
BY
V. H. Lockwood
ATTORNEY.

UNITED STATES PATENT OFFICE.

ENGEBRET JENSEN, EDWARD JENSEN, AND FRANK W. AUSTIN, OF WHEATFIELD, INDIANA.

FERTILIZER-DISTRIBUTER ATTACHMENT FOR CULTIVATORS.

950,230.  Specification of Letters Patent.  Patented Feb. 22, 1910.

Application filed May 28, 1908. Serial No. 435,416.

*To all whom it may concern:*

Be it known that we, ENGEBRET JENSEN, EDWARD JENSEN, and FRANK W. AUSTIN, all of Wheatfield, county of Jasper, and State of Indiana, have invented a certain new and useful Fertilizer-Distributer Attachment for Cultivators; and we do hereby declare that the following is a full, clear, and exact description thereof, reference being had to the accompanying drawings, in which like numerals refer to like parts.

The object of this invention is to provide a practical fertilizer distributer attachment for cultivators.

It is very desirable and economical to be able to fertilize corn or like plants after the same have started to grow, and by and in connection with the cultivator used in cultivating the same. With the invention herein set forth one is enabled to deposit the fertilizer near where there is, or adjacent to, a plant and where there is no plant the fertilizer need not be deposited.

Another feature besides that of the combination above mentioned consists of a practical mechanism for measuring the fertilizer and also in a pair of delivery tubes united at their upper ends and situated so as to receive a single charge of fertilizer, substantially half thereof passing through each delivery tube and said delivery tubes running to a pair of cultivator shoes or plows.

The full nature of said invention will be understood from the accompanying drawings and the following description and claims.

Figure 6:
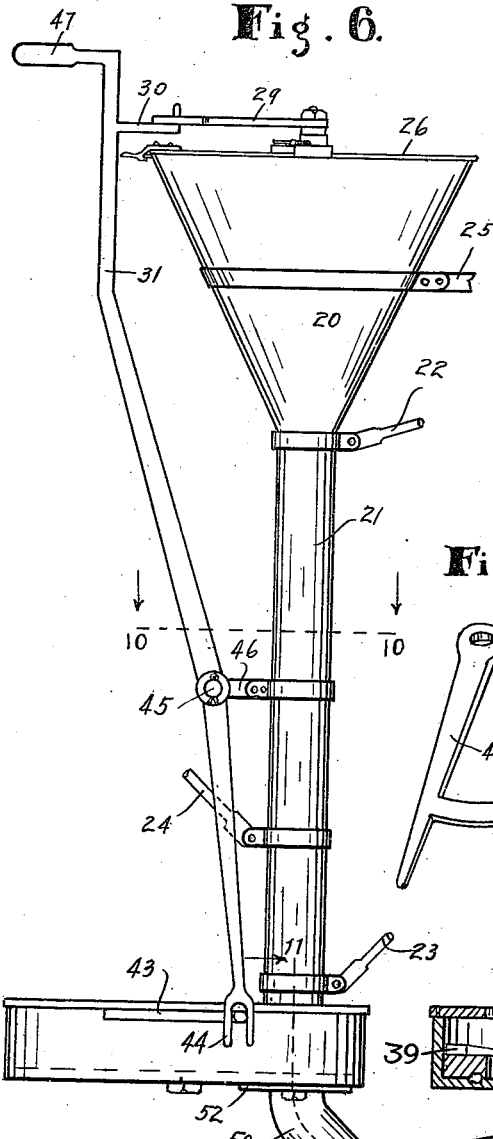
Figure 7:
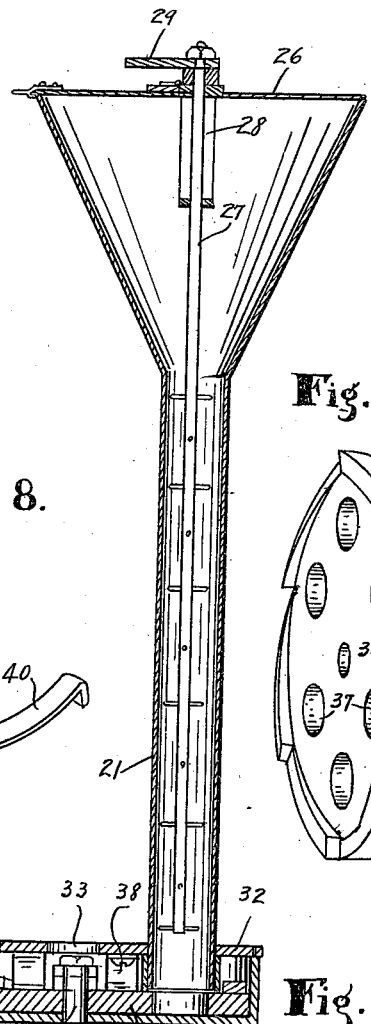
Figure 8:
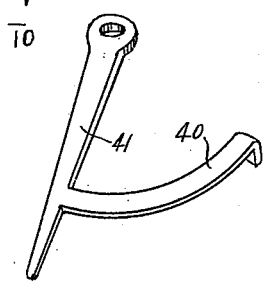
Figure 9:
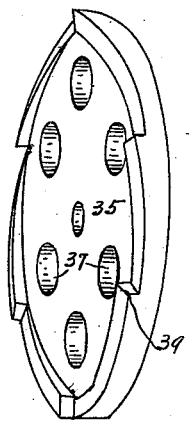
Figure 10:
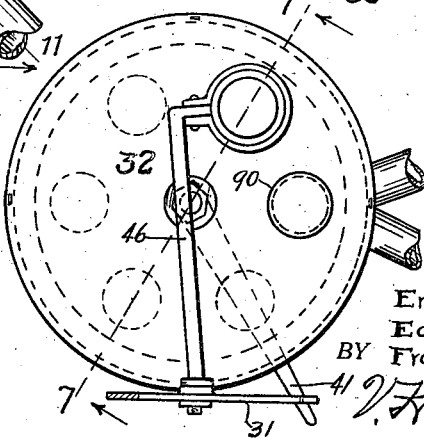
Figure 11:
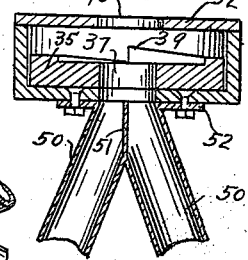

In the drawings Figure 1 is a side elevation of a corn cultivator equipped with a fertilizer distributer attachment, the forward end of the tongue of the cultivator being broken away. Fig. 2 is a vertical transverse section on the line 2—2 of Fig. 1. Fig. 3 is a horizontal section on the line 3—3 of Fig. 2 but on a larger scale. Fig. 4 is a side elevation of the lower part of the cultivator showing one shoe and adjacent parts and the means for delivering the fertilizer thereto, parts being broken away. Fig. 5 is a perspective view of the bottom 50 part of the lower end of the delivering tube. Fig. 6 is a side elevation, on an enlarged scale, of the upper part of the fertilizer distributer attachment, the lower part being broken away. Fig. 7 is a central vertical section through Fig. 6. Fig. 8 is a perspective view of the operating pawl. Fig. 9 is a perspective view of the feeding disk. Fig. 10 is a horizontal section on the line 10—10 of Fig. 6. Fig. 11 is a vertical section through the fertilizer discharging casing and the ends of the discharge tubes adjacent thereto.

In detail 10 is the tongue of the cultivator, 11 one of the wheels, 12 the drag bar, 13 the shoes or furrow opener, 14 the shanks on which the shoes are mounted, 15 the seat for the operator and 16 the levers for manipulating the cultivator. The foregoing parts may be of any desired form and arrangement so far as this distributer attachment is concerned, the use of which attachment is not limited to any particular type of cultivator.

There is a fertilizer hopper 20 with a downwardly extending tube 21 mounted in connection with the cultivator by means of the bars or rods 22, 23, and 24 running from the tube 21 to various stationary parts of the cultivator frame. The hopper 20 and tube 21 are charged with fertilizer and the hopper is closed at the top by the removable lid or plate 26. A stirrer or agitator 27 is journaled in the hopper and tube 21, it being mounted at its upper end in the lid 26 and is braced at its upper end by the brace 28 which is V-shaped and extends down from the top. The stirrer 27 is oscillated by the arm 29 which is operably connected with the arm 30 on the main operating lever 31.

The lower end of the tube 21 of the fertilizer distributer attachment is secured to a horizontally disposed cylindrical casing 32 which has a central opening 33 in the top thereof and a discharge opening 34 in the bottom thereof, the latter being entirely out of alinement with the tube 21. The fertilizer is measured for discharging through the outlet opening 34 by the feeding disk 35 which is rotatably mounted within the casing 32 on the stud 36, the disk 35 lying on the bottom of the casing 32 and being provided with holes 37 that are adapted to register one at a time with the discharge opening 34 in the casing 32. The hole 33 in the casing 32 is for the purpose of rendering the stud 36 accessible for tightening or loosening it. The disk 35 is held down in engagement with the bottom of the casing 32 by some flat springs 38 which are secured to the top of the casing 32 at one end so that their free ends will press on the disk 35.

The disk 35 has on its periphery ratchets 39 adapted to be engaged by the segmental spring hook 40 of the pawl 41. The hook 40 extends segmentally from the pawl 41 which is pivotally mounted on the stud 36 so it can be oscillated. The outer end of the pawl 41 projects beyond the periphery of the casing 32 and through the slot 43 and is engaged by the forked ends 44 of the operating lever 31 so as to be actuated thereby. The operating lever 31 is fulcrumed at 45 to the arm 46 which is clamped to the tube 21 about midway of its length and extends laterally from said tube, as shown in Figs. 6 and 10.

From the foregoing it is obvious that whenever the handle 47 at the upper end of the operating lever 31 is actuated, the feeding disk 35 will be operated one notch so as to bring one of the holes 37 in alinement with the opening or hole 34 in the bottom of the casing 32 and permit the fertilizer in the hole 37 to be discharged. The outlet tube 21 is not in alinement with the hole 34 so that each hole 37 in the disk 35 is filled with fertilizer from the tube 21 before the hole 37 passes from beneath the tube 21 and reaches the discharge hole 34. Therefore, no fertilizer can pass from the tube 21 directly to or through the discharge opening 34 and the quantity of fertilizer at each discharge will be measured by the hole 37.

Two delivering tubes 50 extend from the bottom of the casing 32 to the discharge opening 34 and thence to the shovels, one discharge tube to each shovel. The discharge tubes 50 are joined at their upper ends, in fact are shown integral in the drawings with a partition 51 between them and with a plate 52 whereby the delivering tubes may be secured to the casing 32. Therefore, one-half of a charge of fertilizer in one of the holes 37 drops into one tube 50 and the other half into the other tube 50, as will be understood from Fig. 11.

The tubes 50 are detachably connected with flexible rubber tubes 53 that extend to the discharge boot 54 at the lower end, the lower ends of the tubes being inclined almost to a horizontal position so the boot may move up and down. Said boot is made of metal and has a discharge opening 55 on its under side and has a flange 56 with a hole 57 through which the rod 58 extends. The rod 58 is supported on the arm 59 that is fastened to the shank of the shovel and is bent near its lower end at a right angle and the extreme lower end thereof is fastened to the lower end of the shank of the shovel. The arrangement is such that the boot 54 rides loosely up and down on the rod 58. It is forced upwardly by the dirt as the shovel may be run deeply and the boot at its lower portion is supported by the rod 58.

In the top of the casing 32 we provide a hole 90 vertically above the discharge hole 34 in the bottom of the casing so that the operator can see the work of the machine as it discharges the fertilizer.

What we claim as our invention and desire to secure by Letters Patent is:

1. The combination with a cultivator having shovels, of means for discharging fertilizer, a tube for delivering the fertilizer behind each shovel, and means on which the lower end of the said delivery tube is mounted that permits vertical play of the lower end of the delivery tube.

2. The combination with a cultivator having shovels and shanks on which said shovels are mounted, of means for discharging fertilizer, a delivery tube leading therefrom to a point behind each shovel, and a rod having a vertical portion secured at its upper end to the shank of the shovel and on which the lower end of each delivery tube is loosely mounted, and said rod having a horizontal portion connected with the lower end of the shank of the shovel, substantially as set forth.

3. The combination with a cultivator having shovels, of means for discharging fertilizer, a flexible delivery tube leading therefrom to a point immediately behind the shovel and inclined almost horizontal near its lower end, a discharge boot on the lower end of said delivering tube that is closed excepting on the under side and means for supporting the boot so it can have vertical play.

4. A fertilizer distributing attachment including means for holding the fertilizer, an agitator therein, discharging means, and a hand lever that simultaneously actuates both the agitator and discharging means.

5. A fertilizer distributing attachment including a casing having a horizontal bottom with a discharge opening therein and having a slot in each side thereof, a disk revolubly mounted in said casing on said bottom with a series of holes through it adapted to register with the discharge opening through the bottom of the casing and said disk having ratchets along its periphery, a receptacle for the fertilizer that is provided with a tube entering said casing and adapted to discharge fertilizer in the holes in said disk before they reach the discharge opening in the bottom of the casing, a pawl pivoted concentric on said disk with a hook adapted to engage the ratchets on said disk and with an operating end extending through the slot in said casing, a hand lever fulcrumed between its ends with its lower end in engagement with the outer end of said pawl, a top to the means for holding the fertilizer, a vertically disposed agitator rotatably mounted in said top and extending down into the hopper for holding the fertilizer and an arm extending from said agitator to said lever, whereby the lever will operate both the agitator and said pawl, substantially as set forth.

In witness whereof, we have hereunto affixed our signatures in the presence of the witnesses herein named.

ENGEBRET JENSEN.
   EDWARD JENSEN.
   FRANK W. AUSTIN.

Witnesses:
 SIMON FENDIG,
 H. W. MARBLE.